Jan. 26, 1971 D. J. PARKER ET AL 3,559,101

OPTICAL ISOLATOR

Filed Feb. 12, 1964

INVENTORS
DONALD J. PARKER
BY EDWARD KORNSTEIN

Richard J. Miller
ATTY.

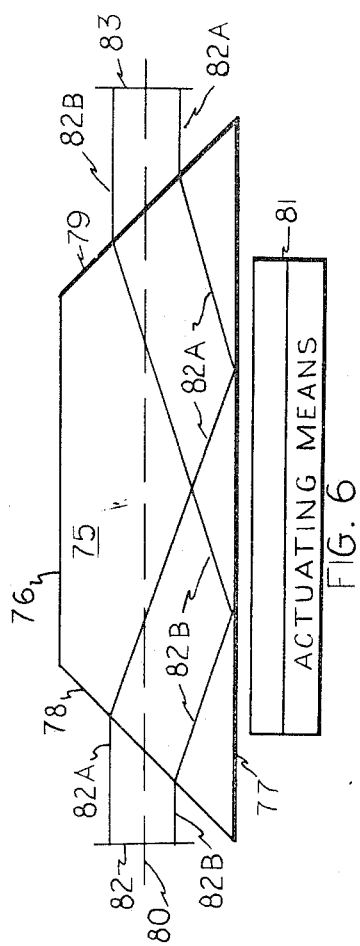
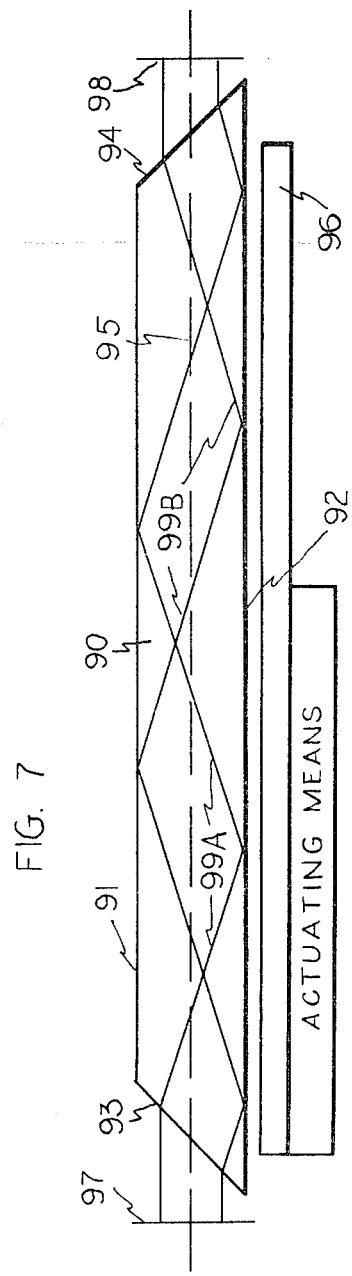

United States Patent Office 3,559,101
Patented Jan. 26, 1971

3,559,101
OPTICAL ISOLATOR
Donald J. Parker, Cherry Hill, N.J., and Edward Kornstein, Belmont, Mass., assignors, by mesne assignments, to the United States of America as represented by the Secretary of the Navy
Filed Feb. 12, 1964, Ser. No. 344,511
Int. Cl. H01s 3/00; G02f 1/28
U.S. Cl. 332—7.51
7 Claims This invention relates to an optical frustrator and more specifically to a device for switching a coherent light beam.

A laser system for producing a coherent electromagnetic radiation in the optical band, as has been developed in recent years, requires many components having extremely short time intervals for actuation. One of the serious problems encountered in such systems is that of switching the coherent light beam within a predetermined time limit and coordinating such switching with other components of the circuit. One type of switching, known as Q-switching, is that which in effect changes the Q of an optical cavity. This is also known as Q-spoiling and is accomplished by changing the reflectivity or transmissivity characteristics of elements such as optical amplifiers or oscillators within the over-all system.

It is, therefore, an object of this invention to provide an improved switching device for a laser system.

It is a further object of this invention to provide an improved frustrated total internal reflector for use as a switching device in the laser system.

It is yet a further object of this invention to provide a controllable switching device operating within microseconds of a received signal.

It is still a further object of this invention to provide an improved frustrator for an optical system wherein a piezo-electric element moves an optical absorber from within one-tenth of a wave length of the light to be shuttered to more than one and a quarter wave length of the light to be shuttered.

It is yet a further object of this invention to provide an optical isolator for devices that emit coherent radiation by stimulated emission, comprising, a predetermined path for coherent radiation of a predetermined wave length, a reflective surface in the path, an absorber spaced from the surface, and means including an electrostrictive material for moving the absorber with respect to the surface to vary the reflective index of the surface.

It is still a further object of this invention to provide a frustrated total internal reflector, comprising, means, having a totally reflecting internal face for reflecting an electromagnetic wave propagated therethrough, a piezoelectric member supported on the means having a planer face parallel to the internal face, means coupled to the member for applying voltage across said member to move in a direction normal to the face, and means, mounted on the planer face to affect the index of refraction of the internal face to absorb the wave.

Yet another object of this invention is to provide an improved modulator for coherent light.

While we have described several embodiments of the present invention they should be regarded as examples of the invention and not as a restriction or a limitation therein as changes may be made in the construction and arrangment of the parts without departing from the spirit and scope of the invention.

FIG. 6 shows a second embodiment of the invention, and FIG. 7 shows a third embodiment of the invention.

Figure 1:
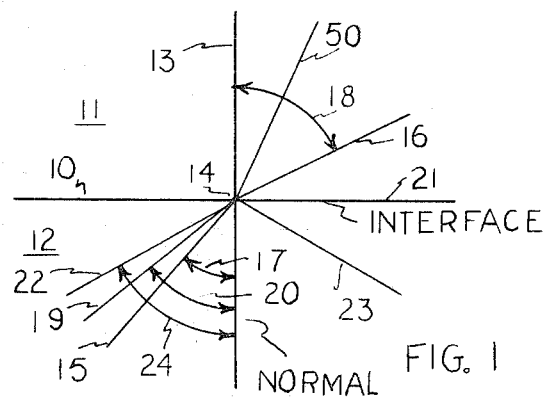
FIG. 1 shows various optical properties and their inherent relationships.

To understand the principles involved in the invention disclosed herein it is best to refer to a few basic laws of optics. Referring to FIG. 1, there is shown by line 10 an interface between two mediums through which an optical ray may pass. As shown the material 11 above the interface 10 has an index of refraction approximately equal to one and the material 12 below the interface has an index of refraction of approximately 1.5. Line 13 is normal to interface 10 intersecting it at a point 14. With these assumed conditions a beam of light following line 15 intercepts the interface at point 14 and is refracted to a path along line 16. Line 15 is at an angle 17 to the normal and is called the angle of incidence. Angle 18 between line 16 and normal 13 is called the angle of refraction. It should be noted that in passing a beam of light from a denser medium to a less dense medium the angle of refraction is greater than the angle of incidence. This relationship may be presented in the following manner: From Snell's Law:

$$\frac{\operatorname{Sin} <17}{\operatorname{Sin} <18} = \frac{n_{11}}{n_{12}}$$

Where $n$ is the index of refraction of the medium.

There is some critical angle, such as angle 20, between a path 19 and normal 13 wherein a beam of light would be neither refracted nor reflected but would lie along the interface 10 as designated by the number 21. At an incidence angle 24, greater than critical angle 20 as represented by a beam passing along line 22 the beam is reflected along a line 23 having an angle of reflection to the normal which is equal to the angle of incidence of line 22. Such a beam is said to be totally internally reflected.

Figure 2:
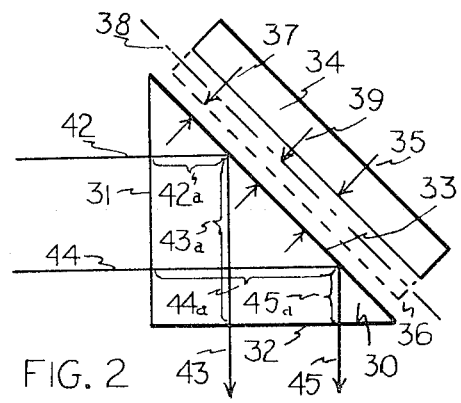
FIG. 2 is a schematic presentation of one embodiment of the invention.

FIG. 2, a simplified diagrammatical presentation of the invention includes a right angle prism 30 including faces 31, 32 and 33. A movable absorber 34, hereinafter described in more detail, is shown positioned a distance 35 from face 33 of prism 30 and parallel thereto. A dotted line construction 36 shows a second possible position to which the absorber 34 may be moved. Its ultimate position is a distance 37 from face 33. A dash-dotted line 38 at a distance 39 from face 33 represents the distance beyond which an electromagnetic field extends even though the surface 33 is totally reflecting. Lines 42, 43 indicate a possible path for a light beam entering the prism through face 31, striking face 33 and being totally reflected therefrom through face 32. Similarly line 44 represents a beam of light which enters the face 31 of prism 30, is totally reflected from face 33 and is directed along line 45. It should be noted that in right angle prism 30 the sum of the distances along lines 42, 43 shown as 42a and 43a is equal to the sum of the distance along lines 44, 45 represented by 44a and 45a.

With the absorber in the position shown by the solid lines a distance 35 from face 33 it does not in any way affect the field 38 and light beams along 42, 44 are totally reflected from surface 33. As the absorber 34 is moved towards face 33 it encounters and disturbs the field pattern 38 and in effect alters the index of refraction at the interface between face 33 and the air or vacuum medium immediately adjacent thereto. Since the index of refraction of the absorber itself is considerably more than that of the prism the situation as represented in FIG. 1 is drastically changed. That is, a beam entering along line 22 and incident to face 33 at an angle greater than the critical angle would not be reflected along line 23 but rather would be refracted along a line 50. This would be true when the absorber is in an extreme position substantially adjacent to face 33.

Figure 3:
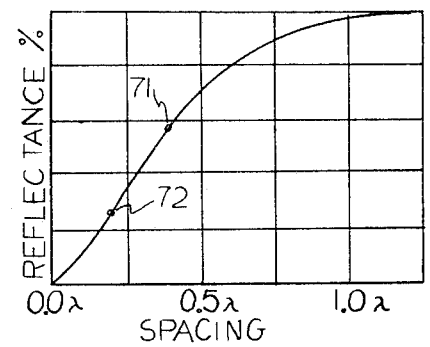
FIG. 3 is a graph showing reflectance versus distance.

This condition is graphically presented in FIG. 3 wherein the horizontal or X-axis represents the air or vacuum spacing between face 33 and the absorber as designated in FIG. 2 by the various distances 35, 37, and 39. It is shown in percentages of a wave length of incident light. The distance 39 in FIG. 2 is directly related to wave length in air or vacuum of the light projected along path 42, 44 and is in approximately one wave length. The vertical or Y-axis of FIG. 3 is in percentages of internal reflectance from surface 33 and goes from zero at zero spacing to approximately 100 percent at 1.25 wave length of the light beam acted upon. The physical problems encountered in moving the absorber to substantial touching face 33 are such that in one embodiment of the invention the minimum distance 37 is fixed at about one-tenth of a wave length of light. However, the graph has been extended to zero for the sake of completeness. It is apparent that there is a very complicated interplay between the absorber, the prism face 33 and the medium therebetween which need not be gone into in this application. It is sufficient to say for the purposes of this disclosure that net effect is to vary the reflectance from face 33 from substantially zero to 100 percent; the lower limit being dependent upon the design characteristics and the degree of optical flatness of face 33, the absorption coefficient of absorber 34, and the ability of the system to move the absorber away from face 33. As a practical consideration the lower limit of distance 37, in this embodiment, would be in the neighborhood of one-tenth of a wave length of the beam being acted upon. Thus, with these assumed conditions there will be some reflectance from surface 33.

Figure 5:
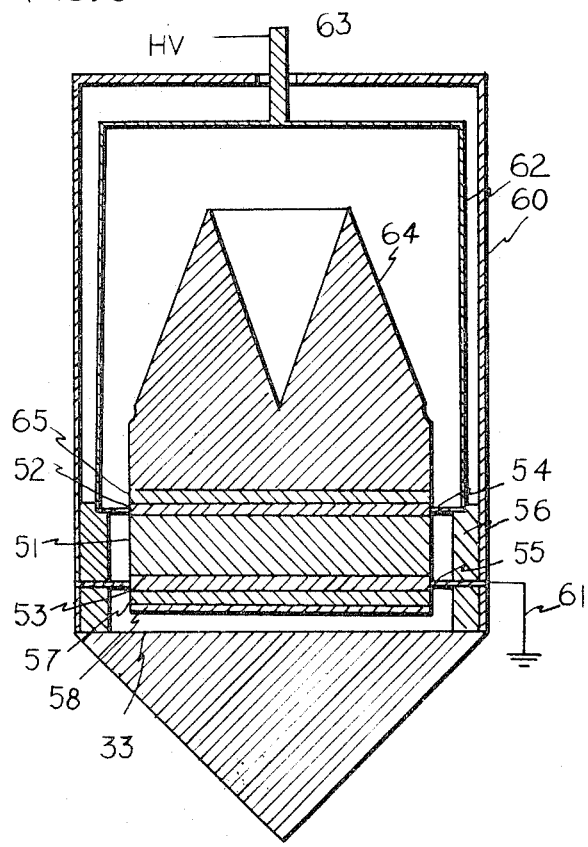
FIG. 5 is a detailed sectional drawing of an embodiment of the invention shown schematically in FIG. 2.

FIG. 5 shows a sectional view of an absorber which is capable of performing the necessary frustration of the internally reflecting surface 33 of FIG. 2. Frustration in this case is defined as the ability to cause a surface to substantially cease to reflect an incident light beam. It is to be noted that the dimensions in the vertical direction are substantially exaggerated for the sake of clarity, keeping in mind that the total vertical displacement of the absorbing surface will be between one and one and one-half microns assuming that the light to be controlled has a wave length in the neighborhood of 6943 angstroms if a Ruby laser beam is to be controlled.

A piezo-electric element 51 has mounted thereon a pair of electrodes 52, 53 and is supported by a pair of flexible conductive spiders 54, 55 on an insulated base member 56. Since it is desirable to have the shortest possible rise time, or stated another way the fastest shuttering time, a piezo-electric element is selected which reacts quickly. One material that has proven to be satisfactory is a lead zirconate ferroelectric ceramic PZP5 manufactured by Clevite Corp. An absorber 57 is mounted on the electrode 53 and may consist of a platinum black material deposited thereon. Since such a material does not have a great deal of mechanical strength it may be desirable to over-lay the carbon black by a silicon oxide layer 58. Such a layer has sufficient strength when ground as thin as 25 angstroms to provide the necessary protection to the absorber 57. An outer housing 60 coupled to ground through leads 61 is also connected to spider 51, thus, maintaining electrode 53 at ground potential which has the advantage of preventing distortion of electrical fields near the innerface of surface 33. An inner can or housing 62, coupled to a high voltage terminal 63, is connected through spider 54 to electrode 52 and applies a voltage to the piezo-electric element 51 to cause necessary distortion and movement of absorber 57.

It has been found advisable to provide an acoustical termination 64 made of a material such as PZP5 coupled through a thin aluminum strip 65 to the piezo-electric element 51. The configuration of termination 64 is such that acoustical waves are not reflected back to the piezo-electric element but rather dissipate the energy before distortion can result.

The entire unit is sealed to the face 33 of a right angle prism as shown in FIG. 2 and evacuated so that the motion of the transducer element 51 will be impeded in the least possible manner.

Figure 4:
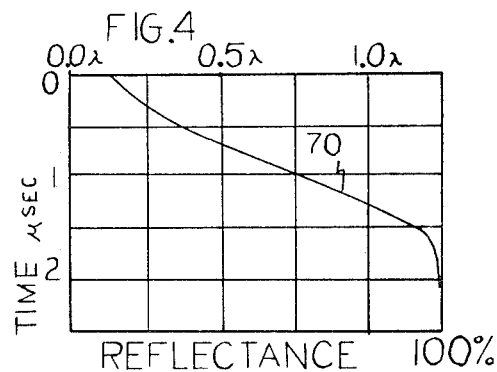
FIG. 4 is a graph showing internal reflectance of a surface in FIG. 2 with respect to time-displacement of an adjacent movable surface.

With this construction, when the piezo-electric element 51 is at zero potential absorber 57 is substantially five-fourths of a wavelength away from face 33. When a voltage in this case approximately 5000 volts is applied via terminal 63 and spider 54 to electrode 52, the piezo-electric element 51 distorts downwardly and moves the absorber to a distance of about-one-tenth of a wave length of the light to be shuttered from face 33. Effectively this reduces the reflectance of face 33 to approximately 10 percent and the remaining light incident thereto is absorbed. When it is desirable to reflect the beam from face 33, the voltage may be removed either by short circuiting or other satisfactory means and element 51 moves absorber 57 upwardly to the required five-fourths of a wave length spacing from face 33. FIG. 4 is a typical graphic presentation of the distance that the absorber is from face 33 at any given time after removal of the voltage. Curve 70 intercepting the X-axis at approximately one-tenth of a wave length shows that the reflectance rapidly approaches 100 percent within a little better than one microsecond for the assumed conditions of the circuit as described.

By placing two isolators in series, the total light reflected when the absorbers are close to the internally reflecting surfaces would be reduced to approximately one percent.

FIG. 3 has two points 71, 72 which define therebetween a substantially linear portion of the curve. If the conditions and parameter of the isolator are properly selected then element 51 may be made to oscillate about a mid point and light beams reflected from the surface 33 would be modulated at the frequency of oscillation.

FIG. 6, a second embodiment of the invention, is especially adapted for frustrating a coherent electromagnetic wave radiation when it is desirable to maintain the direction of the radiation in substantially same direction as received. A prism 75 of glass, is shown having a pair of parallel surfaces 76, 77 and a pair of surfaces 78, 79 at forty-five degrees with a line 80 parallel to surface 77 and in a plane perpendicular to faces 78, 79. If desired, surfaces 78, 79 may be coated with a multilayer dielectric film. A frustrator 81 shown schematically adjacent and parallel to surface 77 is movable in a direction normal to surface 77 to totally frustrate the internal reflection from that surface. A planer wave front designated 82 is shown schematically composed of two rays of light 82A and 82B substantially parallel. Ray 82A is incident to surface 78 at forty-five degrees and is refracted in a downward direction as shown. It is totally internally reflected from surface 77 and is incident to surface 79 at an angle which is less than the critical angle and hence is refracted to proceed in a direction substantially parallel to line 80. Similarly the ray 82B is refracted at surface 78 reflected from surface 77 and refracted by surface 79 so that it emerges from surface 79 substantially parallel to line 80.

If the frustrator 81 is moved to within a tenth of a wave length or less of surface 77 the propagated beam is not internally reflected from surface 77 but is frustrated and the beam refracted and there is little propagation from surface 79. With the configuration as shown the total distance that the ray 82A travels from wave front 82 to a wave front 83 is equal to that traveled by ray 82B and the distances in glass of 82A and 82B are equal.

FIG. 7, a third embodiment of the invention, shows a prism 90 having a pair of plane parallel surfaces 91, 92 and a pair of surfaces 93, 94 mutually perpendicular to each other and at forty-five degrees with axis 95. A movable frustrator 96 is shown adjacent to and parallel with surface 92 and as in the previous embodiments is designed to be movable in a direction normal to surface 92. A plane parallel light beam received at a plane 97, when the absorber 96 is away from surface 92 more than one and one-quarter wave lengths of the light, is refracted by surface 93, reflected from surface 92, reflected from surface 91, reflected a second time from surface 92 and refracted by surface 94. It arrives at a planer wave front 98. Two rays of light 99A and 99B are shown and it is to be noted that the total distances that each travels in the glass or the prism are identical, hence the plane wave light received at 97 is still planer at front 98.

Absorber 96 when moved to within a tenth of a wave length of the light being propagated through the prism will frustrate reflections from surface 92. Because of the mechanical difficulties in moving the absorber into optical contact with surface 92 it is not attempted. Rather the tenth of a wave length separation when the absorber is at its extreme upper position allows perhaps ten percent reflection from surface 92 so that although ninety percent of the radiation would be absorbed by absorber 92 a portion would be reflected along the path indicated. All radiation received at surface 91 is reflected and there is again a 90 percent absorption of the wave at its second incidence with surface 92. The net result is that approximately one percent of the light received at wave front 97 will be received at wave front 98 when the surface 92 is thusly frustrated by absorber 96. If it is desirable to have even a higher percentage of light absorbed a third reflection within the prism could be accomplished and the efficiency could be raised to 99.9 percent. Additional reflections could be provided to substantially reduce the partially frustrated refracted light from surface 94 to zero.

We claim:
1. An optical isolator for devices that emit coherent electromagnetic radiation by stimulated emission of radiation, comprising:
  (a) means, including a prism having a predetermined path for coherent radiation at a given wave length;
  (b) a reflective surface of said prism in said path;
  (c) a support member holding said prism;
  (d) an electrostrictive member having first and second parallel surfaces mounted on said support member, said first and second surfaces being parallel to said reflective surface;
  (e) an absorber mounted on one of said parallel surfaces of said electrostrictive member adjacent said reflective surface;
  (f) an acoustical termination member mounted on said second of said parallel surfaces of said electrostrictive member; and
  (g) means coupled to said electrostrictive member to move said absorber between one-tenth and one and one-quarter of said given wave length of said reflective surface to vary the reflectance from said reflective surface.

2. The isolator of claim 1 wherein said acoustic termination is shaped to prevent reflection of acoustical waves to said electrostrictive member.

3. The device of claim 2 wherein flexible members are provided to support said electrostrictive member.

4. The isolator of claim 3 wherein there is provided an electrical shield about said electrostrictive member to prevent actuation by stray electrical fields.

5. The device of claim 4 wherein a sealed housing is provided about said absorber and said prism face so that the operation is in a vacuum.

6. The isolator of claim 1 wherein said predetermined path for coherent radiation through said prism is reflected at least twice from one reflective surface.

7. The device of claim 6 wherein said absorber is adjacent said doubly reflecting surface of said prism.

References Cited
UNITED STATES PATENTS

| | | | |
|---|---|---|---|
| 2,185,379 | 1/1940 | Meyers et al. | 88—61UX |
| 2,565,514 | 8/1951 | Pajes | 88—61 |
| 2,997,922 | 8/1961 | Kaprelian | 88—61 |
| 3,153,691 | 10/1964 | Kibler | 88—61 |

RICHARD A. FARLEY, Primary Examiner

U.S. Cl. X.R.

350—161